(12) United States Patent
Aga

(10) Patent No.: US 9,372,426 B2
(45) Date of Patent: Jun. 21, 2016

(54) FERRITE PARTICLE HAVING OUTER SHELL STRUCTURE, FERRITE CARRIER CORE MATERIAL FOR ELECTROPHOTOGRAPHIC DEVELOPER, AND ELECTROPHOTOGRAPHIC DEVELOPER

(71) Applicant: POWDERTECH CO., LTD., Chiba (JP)

(72) Inventor: Koji Aga, Chiba (JP)

(73) Assignee: POWDERTECH CO., LTD., Chiba (JP)

( * ) Notice: Subject to any disclaimer, the term of this patent is extended or adjusted under 35 U.S.C. 154(b) by 0 days.

(21) Appl. No.: 14/785,676

(22) PCT Filed: Jan. 16, 2015

(86) PCT No.: PCT/JP2015/051091
§ 371 (c)(1),
(2) Date: Oct. 20, 2015

(87) PCT Pub. No.: WO2015/108149
PCT Pub. Date: Jul. 23, 2015

(65) Prior Publication Data
US 2016/0070193 A1 Mar. 10, 2016

(30) Foreign Application Priority Data

Jan. 20, 2014 (JP) ................................. 2014-008069

(51) Int. Cl.
| | | |
|---|---|---|
| G03G 9/00 | (2006.01) |
| G03G 9/107 | (2006.01) |
| G03G 9/08 | (2006.01) |
| G03G 9/113 | (2006.01) |

(52) U.S. Cl.
CPC ............ *G03G 9/1075* (2013.01); *G03G 9/0819* (2013.01); *G03G 9/107* (2013.01); *G03G 9/1131* (2013.01)

(58) Field of Classification Search
CPC .............................. G03G 9/107; G03G 9/1075
USPC ...................................................... 430/111.31
See application file for complete search history.

(56) References Cited

U.S. PATENT DOCUMENTS

2007/0281160 A1 12/2007 Krishna et al.
2010/0248125 A1 9/2010 Hikichi et al.
(Continued)

FOREIGN PATENT DOCUMENTS

JP 2007-34249 2/2007
JP 2007-320847 12/2007
(Continued)

OTHER PUBLICATIONS
International Search Report, with English-language translation thereof, for PCT/JP2015/051091 having a mailing date of Feb. 10, 2015.
(Continued)

*Primary Examiner* — Mark A Chapman
(74) *Attorney, Agent, or Firm* — Greenblum & Bernstein, P.L.C.

(57) ABSTRACT

It is an object of the present invention to provide a ferrite particle having a low apparent density, and being capable of maintaining various properties thereof in controllable states and filling a fixed volume in a small weight thereof, a ferrite carrier core material and a ferrite carrier for an electrophotographic developer using the ferrite particle, and the like. In order to achieve the object, there are employed the ferrite particle having a porous structure in the interior thereof and an outer shell structure on the outer periphery thereof, the ferrite carrier core material and the ferrite carrier for an electrophotographic developer using the ferrite particle, and an electrophotographic developer using the ferrite carrier.

8 Claims, 6 Drawing Sheets

ELECTRON BEAM IMAGE 8

(56) References Cited

U.S. PATENT DOCUMENTS

| | | |
|---|---|---|
| 2011/0129772 A1 | 6/2011 | Iwata et al. |
| 2014/0065535 A1 | 3/2014 | Kinoshita et al. |

FOREIGN PATENT DOCUMENTS

| | | |
|---|---|---|
| JP | 2010-243798 | 10/2010 |
| JP | 2010-256855 | 11/2010 |
| JP | 2011-112960 | 6/2011 |
| JP | 2012-58344 | 3/2012 |
| JP | 2012-230373 | 11/2012 |

OTHER PUBLICATIONS

Notification of Reasons for Refusal, with English-language translation thereof, for JP App. No. 2014-008069 having a mailing date of Sep. 26, 2015.

FERRITE PARTICLE HAVING OUTER SHELL STRUCTURE, FERRITE CARRIER CORE MATERIAL FOR ELECTROPHOTOGRAPHIC DEVELOPER, AND ELECTROPHOTOGRAPHIC DEVELOPER

TECHNICAL FIELD

The present invention relates to a ferrite particle, particularly to a ferrite carrier core material and a ferrite carrier which are used for a two-component electrophotographic developer used in copying machines, printers and the like, and comprise the ferrite particle, and an electrophotographic developer using the ferrite carrier.

BACKGROUND ART

The method of electrophotographic development is a method in which toner particles in a developer are made to adhere on an electrostatic latent image formed on a photoreceptor to develop the image. The developer used in this method is classified into a two-component developer composed of toner particles and ferrite carrier particles, and a one-component developer using toner particles alone.

As a development method using a two-component developer composed of toner particles and ferrite carrier particles among these developers, a cascade method and the like were formerly employed, but a magnetic brush method using a magnet roll is now in the mainstream.

In a two-component developer, ferrite carrier particles are a carrier substance which is stirred with toner particles in a development box filled with the developer to thereby impart a desired charge to the toner particles, and further transports the charged toner particles to a surface of a photoreceptor to thereby form a toner image on the photoreceptor. The ferrite carrier particles remaining on a development roll holding a magnet are again returned from the development roll to the development box, mixed and stirred with fresh toner particles, and used repeatedly in a definite period.

In a two-component developer, unlike a one-component developer, ferrite carrier particles have functions of being mixed and stirred with toner particles to charge the toner particles and transporting the toner particles, and have good controllability on designing a developer. Therefore, the two-component developer is suitable for full-color development apparatuses requiring a high image quality, high-speed printing apparatuses requiring reliability and durability in image maintenance, and other apparatuses.

In a two-component developer thus used, it is needed that image characteristics, such as image density, fogging, white spots, gradation and resolving power, exhibit predetermined values from the initial stage, and additionally these characteristics do not vary and are stably maintained during endurance printing. In order to stably maintain these characteristics, properties of ferrite carrier particles contained in the two-component developer need to be stable.

Patent Literature 1 (Japanese Patent Laid-Open No. 2012-230373) describes a resin carrier made by using, as a magnetic carrier core material, spherical composite particles composed at least of ferromagnetic iron oxide microparticles and a cured phenol resin, and coating the surface of the particles with a resin.

Patent Literature 2 (Japanese Patent Laid-Open No. 2012-58344) describes a ferrite carrier core material composed of porous ferrite particles, whose composition is represented by $(MnO)_x(MgO)_y(Fe_2O_3)_z$, wherein part of (MnO), (MgO) and/or $(Fe_2O_3)$ is substituted with SrO in 0.3 to 4.0% by weight, and a resin-filled ferrite carrier for an electrophotographic developer prepared by filling the pores with a resin.

Patent Literature 3 (Japanese Patent Laid-Open No. 2007-34249) describes obtaining an electrophotographic developer carrier by adding resin particles, a binder, a dispersant, a humectant and further water to a raw material powder, wet grinding and drying the mixture to thereby obtain a granulated product, calcining and thereafter sintering the granulated product to thereby manufacture a carrier core material having a hollow structure in its interior, and coating the carrier core material with a resin.

In recent years, the employment of a trickle development system has increased the amount of a carrier used, whereas in order to suppress the running cost of a developer, attempts to reduce the amounts of the developer and a carrier used have been made.

As a method of reducing the amount of a carrier used, there is proposed a method of using a carrier having a low apparent density. In the case of using a developing machine having the same volume, when the apparent density is low, the weight of a carrier used is enabled to be reduced.

On the other hand, when a carrier coated with a resin is intended to be used over a longer period, the coating resin exfoliates due to stresses in the interior of a developing machine to resultantly vary the charging property and the resistivity to form images and often make it unable for stable images to be provided over a long period.

Although the low-temperature fixation of toners is being progressed from the viewpoint of the energy saving, the progress of the low-temperature fixation makes the toners to be liable to be adhered to the surface of carriers due to stresses in the interior of a developing machine to resultantly vary the charging property of the carriers and raise apprehension of adversely affecting images.

Although resin-filled carriers and resin carriers are studied in order to solve these problems, there arises such a problem which is that the carriers are liable to have a high resistivity and the control of the resistivity of the carriers is difficult because the carriers use a large amount of a resin. Further since the charging property also is largely influenced by the resin, the use condition as a carrier is likely to be limited.

That is, in order to solve these problems, a carrier is demanded not only which has a low specific gravity but also whose charging property and resistivity can easily be controlled.

CITATION LIST

Patent Literature

[Patent Literature 1] Japanese Patent Laid-Open No. 2012-230373
[Patent Literature 2] Japanese Patent Laid-Open No. 2012-058344
[Patent Literature 3] Japanese Patent Laid-Open No. 2007-034249

SUMMARY OF INVENTION

Technical Problem

Therefore, it is an object of the present invention to provide: a ferrite particle having a low apparent density, and being capable of maintaining various properties thereof in controllable states and filling a fixed volume in a small weight thereof; a ferrite carrier core material and a ferrite carrier for an electrophotographic developer using the ferrite particle; and an electrophotographic developer using the ferrite carrier.

Solution to Problem

As a result of exhaustive studies to solve the above-mentioned problems, the present inventors have found that a ferrite particle having a porous structure in the interior thereof and an outer shell structure on the outer periphery thereof can achieve the above object, and have achieved the present invention. The present invention has been achieved based on these findings.

That is, the present invention provides a ferrite particle having a porous structure in the interior thereof and an outer shell structure on the outer periphery thereof.

The thickness of a portion having the outer shell structure of the ferrite particle according to the present invention is desirably 0.5 to 10 μm.

The average particle size of the ferrite particle according to the present invention is desirably 15 to 60 μm.

The present invention further provides a ferrite carrier core material for an electrophotographic developer using the above ferrite particle.

The present invention further provides a ferrite carrier for an electrophotographic developer in which the above ferrite carrier core material is impregnated with and/or coated with a resin.

The present invention provides an electrophotographic developer comprising the above ferrite carrier and a toner.

The electrophotographic developer according to the present invention is also a refill developer.

Advantageous Effects of Invention

The ferrite particle according to the present invention, since having a porous structure in the interior thereof and an outer shell structure on the outer periphery thereof, has a low apparent density, and can fill a fixed volume in a small weight thereof while various properties thereof are maintained in controllable states. Therefore, an electrophotographic developer comprising a ferrite carrier, obtained by using the above ferrite particle as a ferrite carrier core material and impregnating and/or coating the ferrite carrier core material with a resin, and a toner, since being low in the stirring stress to the toner, hardly causes spent and is excellent in the charging stability in long-period usage.

DESCRIPTION OF EMBODIMENTS

Hereinafter, embodiments to carry out the present invention will be described.

<The Ferrite Carrier Core Material and the Ferrite Carrier for an Electrophotographic Developer According to the Present Invention>

A ferrite particle to be used as the ferrite carrier core material for an electrophotographic developer according to the present invention has a porous structure in the interior thereof and an outer shell structure on the outer periphery thereof (having a core-shell shape). Thereby, the ferrite particle has a low apparent density and various properties thereof can be maintained in controllable states. Further, the ferrite particle according to the present invention can fill a fixed volume in a small weight thereof. Here, a ferrite particle mentioned in the present invention means an aggregate of individual ferrite particles unless otherwise specified; and simply particles refer to individual ferrite particles.

The outer shell structure mentioned here, when after the ferrite particle is embedded in a resin, the cross-section is observed using SEM, needs to have an outer shell structure formed in a visually perceptible degree in the cross-sectional SEM image. More specifically, the outer shell structure refers to one in which an outer peripheral portion having a thickness in a certain range accounts for 80% or more of the peripheral length of the particle. More preferably, the proportion accounted for by an outer peripheral portion in the peripheral length is 90% or more.

The thickness of the outer shell structure is desirably 0.5 to 10 μm, and this range can achieve the desired object. With the thickness of the outer shell structure being smaller than 0.5 μm, the mechanical strength of the ferrite particle is weak and the ferrite particle resultantly breaks when being used as a carrier and may cause flaws on a photoreceptor drum. With the thickness of the outer shell structure exceeding 10 μm, the ferrite particle, since being not unlike conventional ferrite core material particles, even if having an outer shell structure, cannot exhibit a desired effect. The thickness of the outer shell structure is more preferably 0.5 to 8 μm, and most preferably 0.5 to 6.5 μm.

Figure 1:
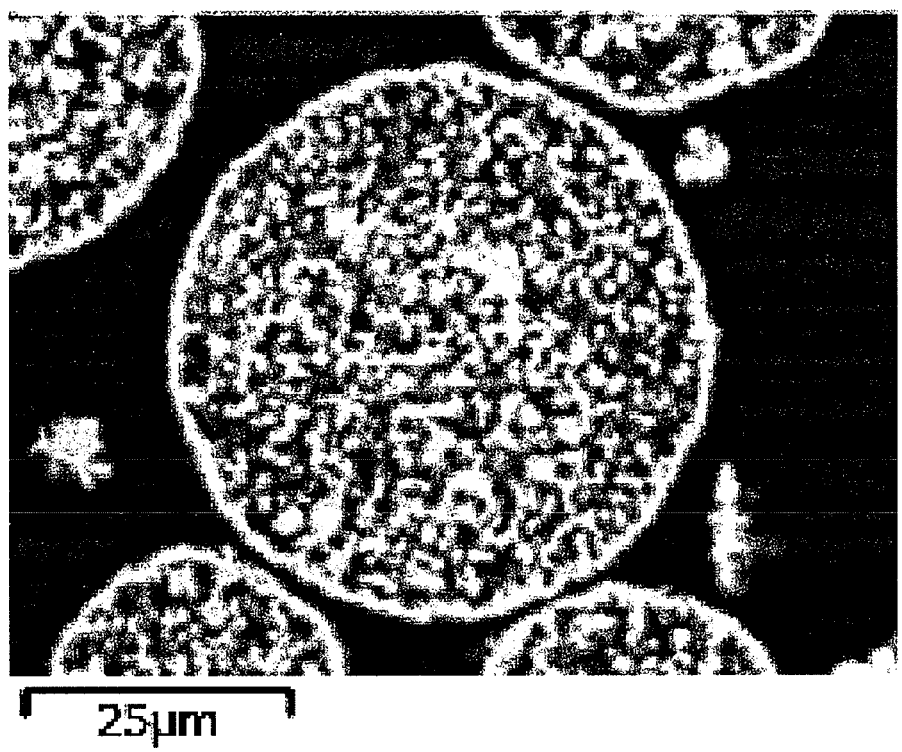
FIG. 1 is an electron microscopy photograph (×200) of a cross-section of the ferrite particle according to the present invention.
Figure 2:
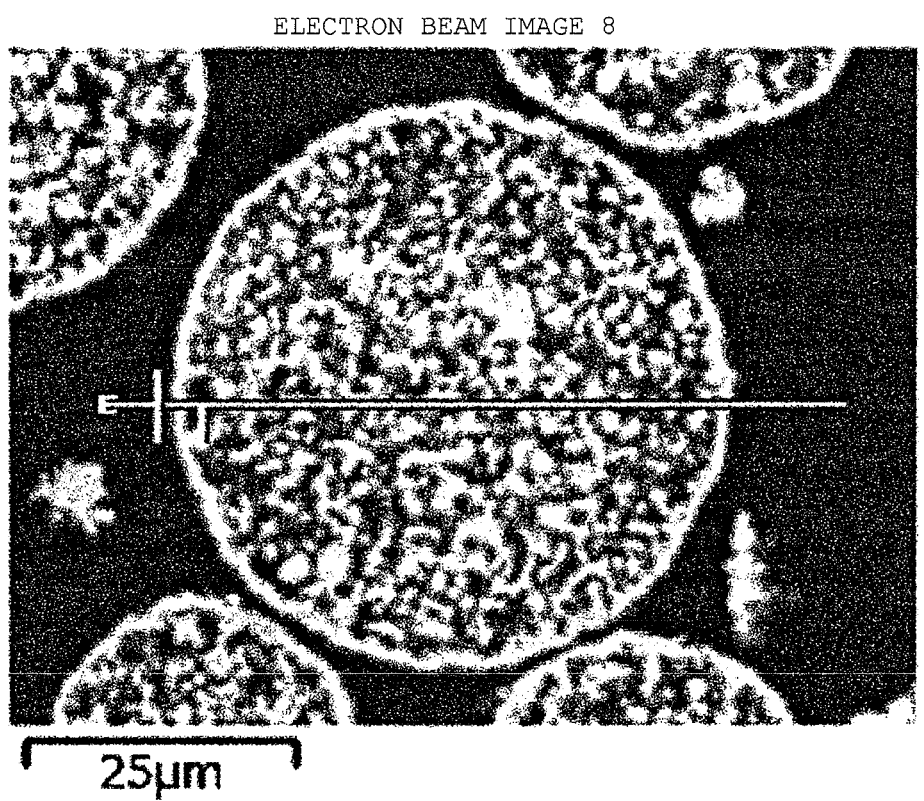
FIG. 2 is the electron microscopy photograph of FIG. 1 illustrating a method of measuring a thickness of a portion having an outer shell structure.
Figure 3:
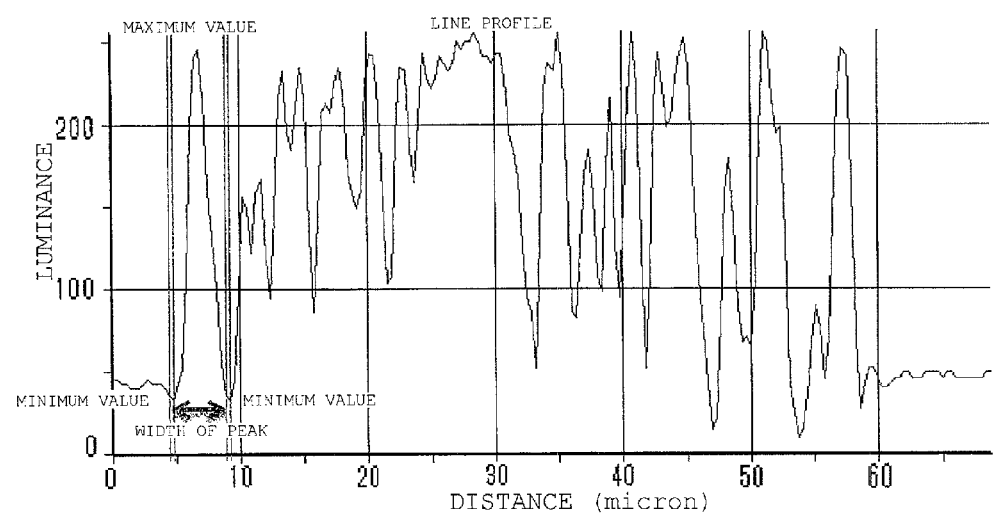
FIG. 3 is a graph acquired by image analyzing the image obtained from FIG. 2.

The thickness of the outer shell structure can be measured, as described in detail in the following, by embedding a ferrite particle in a resin, thereafter, as illustrated in FIG. 2 and FIG. 3, observing the cross-section by using SEM, and image processing the obtained image.

[The Measurement of the Thickness of the Outer Shell Structure]

Here, the measurement of the thickness of the outer shell structure of the particle is carried out by the following procedure.

The ferrite particle was embedded and molded in a resin; thereafter, a cross-section thereof was polished by a polishing machine and vapor deposited with gold was carried out to thereby make a sample for observing its cross-section (for measurement of a thickness of an outer shell portion). The obtained sample was photographed by SEM using a JSM-6060A, manufactured by JEOL Ltd., with an acceleration voltage of 5 kV and a visual field of 200×; and the image information was introduced through an interface to image analysis software (Image-Pro PLUS), manufactured by Media Cybernetics, Inc., and analyzed. Specifically, after the contrast of the acquired image was adjusted, the luminance of the image is extracted for every particle by a line profile function of the analysis software. At this time, the line profile was made such that a straight line was set so as to pass horizontally through nearly the center of the particle; among peaks present in an acquired profile, a peak corresponding to an outer shell portion was interposed between two markers; and the width at this time was taken as a thickness of the outer shell portion. Here, the peak is defined as between a minimum value and a minimum value interposing a maximum value of the line profile. The contrast is preferably adjusted so that the luminance of the portion of an embedding resin (corresponding to the background) is 50% or lower of a maximum luminance. The same operation was carried out for 30 particles and the average value was taken as a thickness of the outer shell structure.

Figure 4:
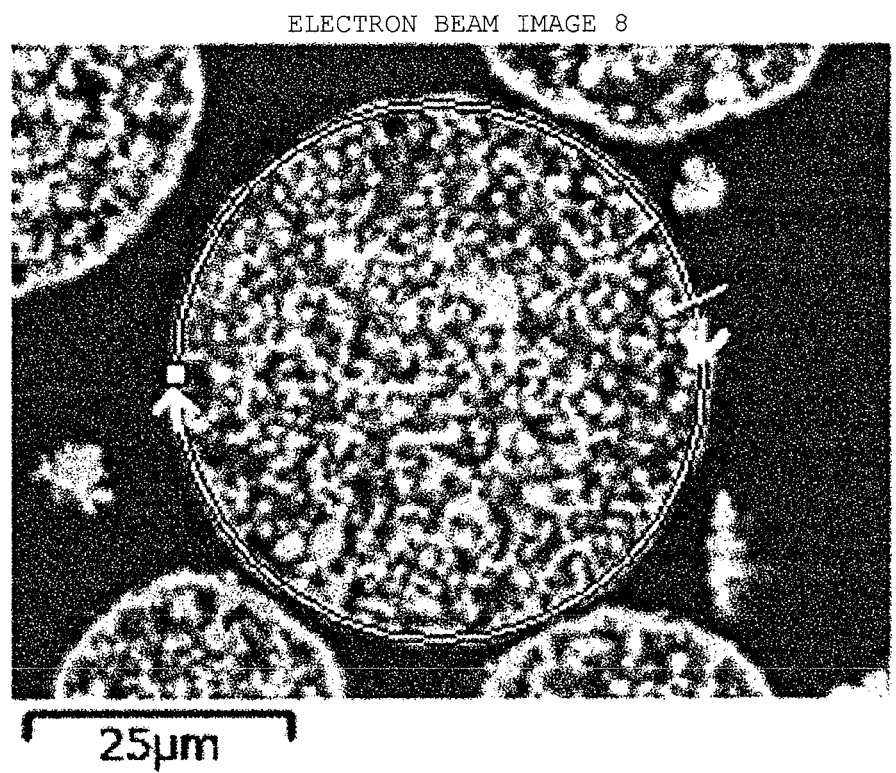
FIG. 4 is the electron microscopy photograph of FIG. 1 illustrating a method of measuring an outer peripheral portion of a portion having an outer shell structure.
Figure 5:
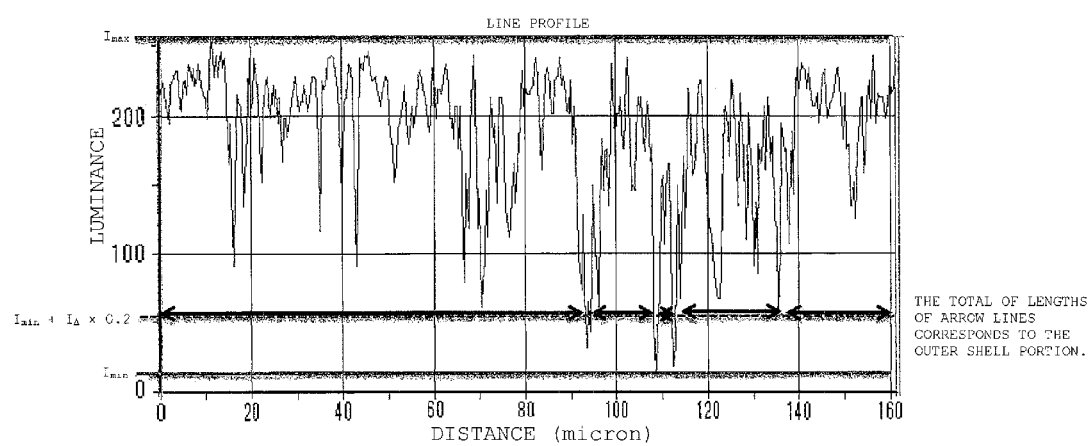
FIG. 5 is a graph acquired by image analyzing the image obtained from FIG. 4.

Further the proportion accounted for by an outer peripheral portion having an outer shell structure in the peripheral length can be measured, as described in detail in the following, by embedding a ferrite particle in a resin, and thereafter, as illustrated in FIG. 4 and FIG. 5, observing the cross-section by using SEM and image processing the acquired image.

[The Measurement of the Proportion in the Outer Peripheral Direction of an Outer Shell Structure]

The line profile is made by carrying out the image processing similar to the above such that an annulus or a free curve (closed curve) is set on an outer shell structure of the particle for every particle. At this time, with a maximum luminance in the profile being taken as $I_{max}$; a minimum one, as $I_{min}$; and the difference between the maximum one and the minimum one, as $I_A$, a range of the $I_{min}$ or higher and lower than ($I_{min}$+ $I_A \times 0.2$) is determined to be a portion having no outer shell structure; and a range of ($I_{min}+I_A \times 0.2$) or higher and $I_{max}$ or lower is determined to be an outer shell portion. Therefore, line profile lengths indicating luminances of ($I_{min}+I_A \times 0.2$) or higher and $I_{max}$ or lower out of luminance data on the line profile length (peripheral length) acquired by the line profile function were totaled, and divided by the line profile length (peripheral length) to thereby calculate and determine a ratio of an outer peripheral portion having a thickness in a fixed range. The same operation was carried out for 30 particles and the average value was taken as a proportion accounted for by the outer peripheral portion in the peripheral length.

The apparent density reduction of conventional ferrite particles is achieved mainly only by making core material particles porous. Whereas the porosity making has a feature of being able to be carried out simply by varying the sintering conditions in regular sintering, pores peculiar to the porosity are uniformly produced from the surface to the interior. Therefore, when resin coating or resin impregnation is carried out as the control of various properties to be used as a ferrite carrier, since the resin is exposed on the surface of the surface-coated particle, the influence of the coating or impregnating resin is large, thus making the control of the properties very difficult.

On the other hand, although the shape of the ferrite particle to be used as the ferrite carrier core material according to the present invention is a grainy particle conventionally existing at one view, the ferrite particle has different densities in the particle between a portion having an outer shell structure (outer shell portion) and the interior of the particle having a porous structure. A more specific feature is such that since the density of the particle interior is low, the pore volume of the particle is large, and since the density of the outer shell portion is high, the pore size is large. Further since the ferrite particle has the outer shell structure, the ferrite particle has a lower apparent density than conventional porous cores. Hence, since the particle interior can be impregnated with a resin with the surface-exposed state of the ferrite particle being maintained in spite of a low apparent density, a core material particle can be provided which has a ferrite surface similar to that of conventional core material particles for carriers and has a low specific gravity. Therefore, a conventional resin used in the property control can be used for the surface, with the state that the influence of the resin in the core material particle interior is suppressed to the minimum, and the properties of a carrier can resultantly be controlled easily.

The ferrite particle to be used as the ferrite carrier core material for an electrophotographic developer according to the present invention desirably contains 0.5 to 4% by weight of Mg and 63 to 70% by weight of Fe.

The incorporation of Mg in the ferrite particle to be used as the ferrite carrier core material according to the present invention enables providing of a developer constituted of a ferrite carrier and a full-color toner and good in charge build-up. That also can raise the resistivity. When the content of Mg is lower than 0.5% by weight, a sufficient incorporation effect cannot be attained; the resistivity becomes low; and the image quality worsens including the generation of fogging and the deterioration of gradation. Further since the magnetization becomes too high, bristles of a magnetic brush become too hard and image defects such as brush streaks are thus caused to be generated. By contrast, when the content of Mg exceeds 4% by weight, since the magnetization decreases, not only ferrite carrier scattering is generated, but also in the case where the sintering temperature is low, the amount of moisture adsorption becomes large due to the influence of hydroxyl groups caused by Mg, and there is thus caused the deterioration of the environmental dependency of electric properties such as the amount of charge and the resistivity.

The case where the content of Fe in the ferrite particle to be used as the ferrite carrier core material according to the present invention is lower than 63% by weight, that is, the case where the content of Mg and/or the content of Ti described later relatively increases means an increase in non-magnetic components and/or low-magnetization components; not only desired magnetic properties cannot be obtained, but also the breakdown of the resistivity is generated on the high-electric field side due to an excessive expansion of the difference between the resistivity of the surface and the resistivity of the interior of the ferrite particle, and white spots and ferrite carrier scattering are thus caused when the ferrite particle is used as a ferrite carrier. By contrast, when the content of Fe exceeds 70% by weight, the effect of the incorporation of Mg cannot be attained and the ferrite particle resultantly substantially becomes a ferrite particle equivalent to magnetite.

The ferrite particle to be used as the ferrite carrier core material for an electrophotographic developer according to the present invention desirably contains 0.5 to 4.5% by weight of Ti. Ti has the effect of reducing the sintering temperature, and not only can reduce aggregated particles but also can provide a uniform and wrinkly surface texture. By contrast, when the content of Ti in the ferrite particle is lower than 0.5% by weight, the effect of the incorporation of Ti cannot be attained; and the BET specific surface area is liable to become large and a sufficient charge property cannot be provided. By contrast, when the content of Ti exceeds 4.5% by weight, the build-up of the magnetization worsens, and the ferrite carrier scattering is thus caused.

It is preferable that the difference in the Ti content between the ferrite particle to be used as the ferrite carrier core material for an electrophotographic developer according to the present invention and a ferrite particle having no outer shell structure, that is, the difference in the Ti content between the particle surface vicinity and the particle interior is 0.5 to 4.5% by weight.

In the case where the difference in the Ti content is smaller than 0.5% by weight, since the amount of composite oxide particles coated is small, a sufficient resistivity as a particle for a ferrite core material after coating is not obtained and the effect cannot be attained. In the case of being larger than 6% by weight, the magnetization is liable to decrease, and the ferrite carrier scattering may be thus caused.

The ferrite particle to be used as the ferrite carrier core material for an electrophotographic developer according to the present invention desirably contains 0 to 1.5% by weight of Sr. Sr contributes to the regulation of the resistivity and the surface texture, and not only has the effect of holding a high magnetization but also attains the effect of enhancing the chargeability of the ferrite particle due to the incorporation thereof; and the effect is large particularly in the presence of Ti. When the content of Sr exceeds 1.5% by weight, the residual magnetization and the coercive force are raised, and in the case where the ferrite particle is used as a developer, image defects such as brush streaks are generated, and the image quality is reduced.

(The Contents of Fe, Mg, Ti and Sr)

The contents of Fe, Mg, Ti and Sr are measured as follows.

0.2 g of the ferrite particle (ferrite carrier core material) was weighed; and a solution in which 20 ml of 1 N hydrochloric acid and 20 ml of 1 N nitric acid were added to 60 ml of pure water was added to the ferrite particle and heated to thereby prepare an aqueous solution in which the ferrite particle is completely dissolved; and the contents of Fe, Mg, Ti and Sr were measured using an ICP analyzer (ICPS-1000IV, manufactured by Shimadzu Corp.).

In the ferrite particle to be used as the ferrite carrier core material for an electrophotographic developer according to the present invention, the magnetization by a VSM measurement when a magnetic field of $5 \text{ K} \cdot 1000/4\pi \cdot \text{A/m}$ is impressed is desirably 55 to 85 $\text{Am}^2/\text{kg}$. When the magnetization at $5 \text{ K} \cdot 1000/4\pi \cdot \text{A/m}$ of the ferrite particle is less than 55 $\text{Am}^2/\text{kg}$, the magnetization of scattering materials deteriorates, and image defects due to ferrite carrier beads carry over are thus caused. By contrast, the case where the magnetization at $5 \text{ K} \cdot 1000/4\pi \cdot \text{A/m}$ of the ferrite particle exceeds 85 $\text{Am}^2/\text{kg}$ is not in the compositional range of the ferrite carrier core material according to the present invention.

(The Magnetic Property)

The magnetic property was measured using a vibrating sample-type magnetometer (model: VSM-C7-10A (manufactured by Toei Industry Co., Ltd.)). A measuring sample (ferrite particle) was packed in a cell 5 mm in inner size and 2 mm in height, and set on the magnetometer. The measurement was carried out by impressing a magnetic field and sweeping the impressing magnetic field to $5 \text{ K} \cdot 1000/4\pi \cdot \text{A/m}$. Then, the impressing magnetic field was reduced, and a hysteresis curve was created on a recording paper. The magnetization at an impressing magnetic field of $5 \text{ K} \cdot 1000/4\pi \cdot \text{A/m}$ was read out from data of the curve. Further the residual magnetization and the coercive force were similarly calculated.

The ferrite particle to be used as the ferrite carrier core material for an electrophotographic developer according to the present invention has a volume-average particle size of preferably 15 to 60 μm as measured by a laser diffraction-type particle size distribution measuring device, more preferably 15 to 50 μm, and most preferably 20 to 50 μm. When the volume-average particle size of the ferrite particle is smaller than 15 μm, the ferrite carrier beads carry over is liable to be generated, which is not preferable. When the volume-average particle size of the ferrite particle exceeds 60 μm, the image quality is liable to deteriorate, which is not preferable.

(The Volume-Average Particle Size)

The volume-average particle size was measured by a laser diffraction scattering method. As a measuring device, a Microtrac particle size analyzer (Model: 9320-X100), manufactured by Nikkiso Co., Ltd. was used. The measurement was carried out with the refractive index of 2.4 and under the environment of 25±5° C. and a humidity of 55±15%. The volume-average particle size (median size) mentioned here refers to a cumulative-50% particle size in the volume distribution mode and the undersize expression. Water was used as a dispersion medium.

The ferrite particle to be used as the ferrite carrier core material for an electrophotographic developer according to the present invention has a BET specific surface area of desirably 0.2 to 1 $\text{m}^2/\text{g}$, and more desirably 0.2 to 0.85 $\text{m}^2/\text{g}$.

In the case where the BET specific surface area is smaller than the range described above, not only the anchor effect of a resin cannot sufficiently be obtained even if the resin coating is carried out, but also ferrite particles are aggregated due to the resin which has not been used for coating in some cases. Hence, the substantial amount of coating resin decreases, and the life as a ferrite carrier is shortened; and the aggregated ferrite particles are disintegrated in a developing machine to thereby largely expose the ferrite particle surface and reduce the resistivity, and the generation of the ferrite carrier scattering is thus caused. In the case where the BET specific surface area is larger than the range described above, since the coating resin does not reside on the ferrite particle surface and excessively infiltrates, a desired resistivity and amount of charge as a ferrite carrier cannot be obtained in some cases. When the BET specific surface area is measured, since the measurement result may be influenced by moisture of the ferrite particle surface of a measuring sample, a pretreatment is preferably carried out in which moisture adhered to the sample surface is removed as much as possible.

(The BET Specific Surface Area)

The measurement of the BET specific surface area used a specific surface area measuring device (model: Macsorb HM model-1208 (manufactured by Mountech Co., Ltd.)). About 5 to 7 g of a measuring sample was put in an own standard sample cell of the specific surface area measuring device, and weighed precisely by a precision balance; then, the sample (ferrite particle) was set on a measuring port, and the measurement was started. The measurement is carried out in a one-point method; when the weight of the sample is input at the time of the finish of the measurement, a BET specific surface area is automatically calculated. Here, as a pretreatment before the measurement, about 20 g of the measuring sample was taken in a chartula, thereafter deaerated to −0.1 MPa by a vacuum drier, and after it was confirmed that the degree of vacuum reached −0.1 MPa or less, heated at 200° C. for 2 hours.

The environment: temperature: 10 to 30° C., moisture: 20 to 80% in relative humidity, no dew condensation.

The ferrite particle to be used as the ferrite carrier core material for an electrophotographic developer according to the present invention desirably has an electric resistivity of $5 \times 10^7$ to $1 \times 10^{11} \Omega$ at a 6.5 mm-gap impressing voltage of 50 V.

In the case where the electric resistivity of the ferrite particle at a 6.5 mm-gap impressing voltage of 50 V is lower than $5 \times 10^7 \Omega$, the resistivity is too low and when the ferrite particle is used as a ferrite carrier, white spots may be generated and the ferrite carrier scattering may be caused. In the case where the electric resistivity of the ferrite particle is higher than $1 \times 10^{11} \Omega$, when the ferrite particle is used as a ferrite carrier, images whose edges are too sharp are made in some cases.

(The Electric Resistivity)

The electric resistivity is measured as follows.

Non-magnetic parallel flat plate electrodes (10 mm×40 mm) are opposed to each other with an electrode interval of 6.5 mm, and 200 mg of a sample (ferrite particle) is weighed and packed therebetween. A magnet (surface magnetic flux density: 1,500 Gauss, the area of the magnet contacting with the electrodes: 10 mm×30 mm) was attached to the parallel flat plate electrodes to hold the sample between the electrodes; and voltages of 50 V, 100 V, 250 V, 500 V and 1,000 V were impressed, and the respective resistivitys at the impressing voltages were measured by an insulation resistivity tester (SM-8210, manufactured by DKK-TOA Corp.).

The ferrite particle desirably has a pore volume of 0.006 to 0.02 ml/g and a peak pore size of 0.7 to 2 µm.

The case where the pore volume of the ferrite particle is smaller than 0.006 ml/g means that the pores in the particle interior are small and a low-apparent density particle is not made, and may not achieve the life elongation when the ferrite particle is used as a carrier. By contrast, the case where the pore volume of the ferrite particle exceeds 0.02 ml/g means that the apparent density is too low, and reduces the magnetic force of one particle as a magnetic powder and may cause carrier scattering.

The case where the peak pore size of the ferrite particle exceeds 2 µm means that the ferrite particle does not become a low-apparent density particle; and when the ferrite particle is used as a carrier, the life elongation may not be achieved, or even if the particle is impregnated with a resin, the resin does not infiltrate in the particle interior and resultantly covers the surface vicinity, and the regulation of the electric resistivity as a carrier may be difficult. By contrast, when the peak pore size of the ferrite particle is smaller than 0.7 µm, resin impregnation is easy and the resistivity as a carrier is liable to increase, and the image density may not be secured.

When the pore volume and the peak pore size are thus in the above ranges, the above problems are eliminated and a moderately weight-reduced ferrite particle can be obtained.

[The Pore Size and the Pore Volume of the Ferrite Particle]

The measurements of the pore size and the pore volume of the ferrite particle are carried out as follows. That is, these were measured using mercury porosimeters Pascal 140 and Pascal 240 (manufactured by Thermo Fisher Scientific Inc.). As a dilatometer, a CD3P (for powder) was used; and a sample was put in a commercially available gelatin-made capsule perforated plurally, and was put in the dilatometer. The sample was deaerated by the Pascal 140; and thereafter, the porosimetry in a low-pressure region (0 to 400 kPa) was carried out by filling with mercury, which was taken as a first run. Then, the deaeration and the porosimetry in a low-pressure region (0 to 400 kPa) were again carried out, which was taken as a second run. After the second run, the total weight of the dilatometer, the mercury, the capsule and the sample was measured. Then, the porosimetry was carried out in a high-pressure region (0.1 MPa to 200 MPa) by the Pascal 240. Based on the amounts of mercury intrusion acquired in the high-pressure region measurement, the pore volume, the pore size distribution and the peak pore size of the ferrite particle were determined. Here, when the pore size was determined, the calculation was carried out by taking the surface tension of mercury to be 480 dyn/cm and the contact angle to be 141.3°.

In the resin-impregnated ferrite carrier core material for an electrophotographic developer according to the present invention, the porous portion of the interior of the ferrite carrier core material (ferrite particle) is impregnated with a resin. The number of times of the resin impregnation may be once, or a plural number of times of twice or more; and the number of times of the resin impregnation can be determined according to desired properties. Further the composition of an impregnating resin, the amount of resin impregnation and an apparatus to be used for the resin impregnation, in the case where the resin impregnation is carried out in a plural number of times of twice or more, may be changed or may not be changed. Further the ferrite carrier core material (having been impregnated) for an electrophotographic developer is naturally allowed to be directly used as a ferrite carrier, without being coated with a resin, depending on combinations with toners.

The amount of resin impregnation of the resin-impregnated ferrite carrier core material for an electrophotographic developer according to the present invention is desirably 4 to 20% by weight with respect to the ferrite carrier core material. When the amount of resin impregnation is smaller than 4% by weight, the particle interior cannot be sufficiently impregnated with the resin; in the case where a high electric field is impressed, the dielectric breakdown may be caused, and image defects such as white spots may be thus caused. By contrast, when the amount of resin impregnation exceeds 20% by weight, since the surplus resin overflows the surface, the resistivity becomes too high and the image density may resultantly decrease.

In the ferrite carrier for an electrophotographic developer according to the present invention, the amount of resin coating is desirably 0.5 to 4% by weight with respect to the resin-impregnated ferrite carrier core material. When the amount of resin coating is smaller than 0.5% by weight, formation of a uniform coating layer on the ferrite carrier surface is difficult; and by contrast, when the amount of resin coating exceeds 4% by weight, aggregation of the ferrite carriers is resultantly generated, and a decrease in the productivity such as a decrease in yield, and the variation of developer properties such as the fluidity and the amount of charge in an actual machine are caused.

The impregnating and/or coating resin to be used here can suitably be selected according to a toner to be combined with, the environment to be used and the like. The kind thereof is not especially limited, but examples thereof include fluororesins, acrylic resins, epoxy resins, polyamide resins, polyamideimide resins, polyester resins, unsaturated polyester resins, urea resins, melamine resin, alkyd resins, phenol resins, fluorinated acrylic resins, acryl-styrene resins and silicone resins, and silicone resins modified with an acrylic resin, a polyester resin, an epoxy resin, a polyamide resin, a polyamideimide resin, an alkyd resin, a urethane resin, a fluororesin or the like. In the present invention, acrylic resins, silicone resins and modified silicone resins are most preferably used.

In order to control the electric resistivity, the amount of charge and the charging rate of the ferrite carrier, an impregnating and/or coating resin can contain a conductive agent. Since a conductive agent itself has a low electric resistivity, a too much content thereof is liable to cause rapid charge leakage. Therefore, the content of a conductive agent is, with respect to a solid fraction of the impregnating and/or coating resin, 0 to 15% by weight, preferably 0 to 10% by weight, and especially preferably 0 to 8% by weight. The conductive agent includes conductive carbon, oxides such as titanium oxide and tin oxide, and various types of organic conductive agents.

The impregnating and/or coating resin can contain a charge control agent. Examples of the charge control agent include various types of charge control agents commonly used for toners, and various types of silane coupling agents and inorganic microparticles. This is because, in the case where the exposed core material area is controlled so as to become relatively small by the formation of a coating layer, the charging capability decreases in some cases, but addition of various types of charge control agents and silane coupling agents can control the charging capability. The type of a charge control agent or a coupling agent usable is not especially limited, but is preferably a charge control agent such as a nigrosine dye, a quaternary ammonium salt, an organic metal complex or a metal-containing monoazo dye, or an aminosilane coupling agent, a fluorine-based silane coupling agent or the like. The inorganic microparticle usable for charge control suffices if being a substance having a deviated electronegativity, and silica or the like is preferably used.

<Methods for Manufacturing the Ferrite Carrier Core Material and the Ferrite Carrier for an Electrophotographic Developer According to the Present Invention>

Then, methods for manufacturing the ferrite carrier core material and the ferrite carrier for an electrophotographic developer according to the present invention will be described.

A method for manufacturing a ferrite particle to be used as the ferrite carrier core material for an electrophotographic developer according to the present invention is carried out, for example, as follows.

(The Preparation of a Particle for a Ferrite Core Material)

Each compound of Fe and Mg, further as required, compounds of Ti and the like are crushed, mixed, and calcined, and thereafter pulverized by a rod mill to thereby make a calcined powder (particles) for a ferrite core material.

One example of preferable compositions of the calcined powder for a ferrite core material is: 63 to 70% by weight of Fe, 0.5 to 4% by weight of Mg, 1 to 4.5% by weight of Ti and 0 to 1.5% by weight of Sr.

By meeting the above compositional range of the calcined powder for a ferrite core material, after the Ti compound is coated, necessary and sufficient various properties as the ferrite carrier core material for an electrophotographic developer can be attained.

Water, and as required, a dispersant, a binder and the like are added to the above calcined powder for a ferrite core material to thereby make a slurry; and after the viscosity is regulated, the slurry is formed into particulates and granulated by a spray drier; and the resultant is subjected to a debindering treatment to thereby obtain a particle for a ferrite core material. The debindering treatment is carried out at 600 to 1,000° C.

The slurry particle size $D_{50}$ of the slurry is desirably 0.5 to 4.5 μm. By making the slurry particle size in the above range, a ferrite particle having a desired BET specific surface area can be obtained. When the slurry particle size $D_{50}$ is smaller than 0.5 μm, since the specific surface area of the calcined powder after pulverizing becomes too large and the sintering of the ferrite particle progresses too much, no ferrite particle having a desired BET specific surface area can be obtained. When the slurry particle size exceeds 4.5 μm, when the ferrite particle is impregnated with and/or coated with a resin, not only a desired ferrite carrier property cannot be attained, but also the strength of an obtained ferrite carrier core material (ferrite particle) and/or ferrite carrier worsens and broken pieces of crushed ferrite particles may cause image defects.

In order to make the slurry particle size in the above range, when a slurry for regular granulation is prepared, the pulverizing time may be controlled; or pulverizing media are selected so as to make target slurry particle size and particle size distribution; or raw material particles present in a slurry are classified using a wet cyclone. In the case of using a wet cyclone, since the solid fraction of a slurry after the classification differs, the regulation of the solid fraction is again needed, but since a target slurry particle size can be made in a short time, the case of the wet cyclone may be combined with the control of the pulverizing time.

$TiO_2$ particles for coating desirably have a volume-average particle size of 0.05 to 3 μm. When the volume-average particle size is smaller than 0.05 μm, the coating particles are liable to become aggregated materials when the microparticles are adhered to the surface of a particle for a ferrite core material, and unevenness is liable to be caused on a coating layer even if the ferrite core material particle surface is coated with the coating particles in a desired amount of coating; then, a sufficient resistivity as a ferrite carrier core material may not be provided. When the volume-average particle size exceeds 3 μm, the coating particles hardly uniformly adhere to a ferrite carrier core material particle, and regions having a low magnetization are produced partially on the surface of the one ferrite carrier core material particle after the regular sintering; the magnetization of scattering materials thereby decreases and the ferrite carrier scattering is thus caused when the ferrite carrier core material particle is used as a ferrite carrier.

The $TiO_2$ particle for coating is, though depending on its volume-average particle size, preferably 0.8 to 7% by weight with respect to a particle for a ferrite core material. In the case of being less than 0.8% by weight, a sufficient resistivity cannot be provided after the regular sintering. In the case of being more than 7% by weight, the particles for ferrite coating which have not adhered to the particle for a ferrite core material are aggregated and form low-magnetization particles in some cases, and the ferrite carrier scattering is thus caused when the particle for a ferrite core material is used as a ferrite carrier.

(The Preparation of a Ferrite Particle)

The $TiO_2$ particles for coating were added to the particle for a ferrite core material obtained as described above, and mixed by a mixing mill to thereby make a raw material for a ferrite particle. The raw material for a ferrite particle is sintered at 950 to 1,230° C. in an inert atmosphere or a weak oxidative atmosphere, for example, a nitrogen atmosphere or a mixed gas atmosphere of nitrogen and oxygen having an oxygen concentration of 3% by volume or lower.

Thereafter, the sintered material is disintegrated and classified to thereby obtain a ferrite particle. The sintered material is size-regulated to a desired particle size by using a classification method such as an existing air classification, mesh filtration or precipitation method. In the case of carrying out dry-type recovering, the recovering may be carried out by a cyclone or the like.

In such a way, a ferrite particle is obtained which is used as the ferrite carrier core material, having each of the above properties, for an electrophotographic developer according to the present invention.

There is proposed, as described before, a method for carrying out regular sintering after microparticles are adhered to the surface of the particle for a ferrite core material before the regular sintering; but in the case where microparticles having been subjected to no charge-imparting pretreatment are adhered to the surface of the particle for a ferrite core material before regular sintering, in a dry system, the microparticles to be adhered vigorously aggregate and are hardly adhered to the particle for a ferrite core material, or the deviation of the composition becomes large because the microparticles are adhered as large aggregated materials; and the properties of the ferrite particle obtained after regular sintering are never good.

In the ferrite particle according to the present invention, the surface of the $TiO_2$ particle for coating to be adhered may be subjected to a charge-imparting surface treatment in order to give easy dispersibility thereto. By carrying out the charge-imparting surface treatment, the aggregation of the particles is reduced and the particles become easily adhered to the particle for a ferrite core material for coating before regular sintering. Further by using a surface treating agent having a polarity reverse to a charge polarity of the particle for a ferrite core material, there can be attained the effect of preventing the detachment of the $TiO_2$ particle for coating adhered to the particle for a ferrite core material before regular sintering.

A wet-system surface coating of the microparticles to the particle for a ferrite core material before regular sintering, since needing the removal of liquids as solvents for each raw material for a ferrite particle to be surface-coated to thereby necessitate a large-scale processing, increases the cost. A dry-system coating of the microparticles to the particle for a ferrite core material has such a feature that it suffices if only the surface treatment of the microparticles is carried out, which is easily carried out and little increases the cost.

The resin-impregnated ferrite carrier core material for an electrophotographic developer according to the present invention can be obtained by impregnating pores of the above ferrite carrier core material (ferrite particle) with the above resin.

The ferrite carrier for an electrophotographic developer according to the present invention can be obtained by collectively carrying out the resin impregnation and resin coating of the ferrite particle by further coating the surface with the above resin or increasing the amount of the above impregnating resin. A method of resin impregnation and/or coating can use a well-known method, for example, a brush coating method, a spray dry system using a fluidized bed, a rotary dry system or a dip-and-dry method using a universal stirrer. In order to improve the surface coverage, the method using a fluidized bed is preferable.

In the case where after the ferrite carrier core material is impregnated with and/or coated with the resin, baking is carried out, the baking may be carried out using either of an external heating system and an internal heating system, for example, a fixed or fluidized electric furnace, a rotary electric furnace, a burner furnace or a microwave system. In the case of using a UV curing resin, a UV heater is used. The baking temperature is different depending on a resin to be used, but needs to be a temperature equal to or higher than the melting point or the glass transition point; and for a thermosetting resin, a condensation-crosslinking resin or the like, the temperature needs to be raised to a temperature at which the curing progresses fully.

<The Electrophotographic Developer According to the Present Invention>

Then, the electrophotographic developer according to the present invention will be described.

The electrophotographic developer according to the present invention comprises the above-mentioned ferrite carrier for an electrophotographic developer, and a toner.

A toner particle constituting the electrophotographic developer according to the present invention includes a pulverized toner particle manufactured by a pulverizing method and a polymerized toner particle manufactured by a polymerizing method. In the present invention, the toner particles obtained by either of the methods can be used.

The pulverized toner particle can be obtained, for example, by sufficiently mixing a binding resin, a charge control agent and a colorant by a mixer such as a Henschel mixer, then melting and kneading the mixture by a twin-screw extruder or the like, cooling, then pulverizing and classifying the extruded material, and adding external additives to the classified material, and then mixing the mixture by a mixer or the like.

The binding resin constituting the pulverized toner particle is not especially limited, but includes polystyrene, chloropolystyrene, styrene-chlorostyrene copolymers, styrene-acrylate copolymers, styrene-methacrylic acid copolymers, and additionally rosin-modified maleic resins, epoxy resins, polyester resins and polyurethane resins. These are used singly or as a mixture thereof.

The charge control agent usable is any one. Examples thereof for a positively chargeable toner include nigrosine dyes and quaternary ammonium salts; and examples thereof for a negatively chargeable toner include metal-containing monoazo dyes.

The colorant (coloring material) usable is a conventionally known dye or pigment. For example, usable are carbon black, phthalocyanine blue, Permanent Red, chrome yellow, phthalocyanine green and the like. Besides, external additives, such as silica powder and titania, to improve the fluidity and aggregation resistivity of a toner, may be added depending on the toner particles.

The polymerized toner particle is a toner particle produced by a well-known method such as a suspension polymerization method, an emulsion polymerization method, an emulsion aggregation method, an ester extension polymerization method or a phase transition emulsion method. Such a polymerized toner particle is obtained, for example, by mixing and stirring a colored dispersion liquid in which a colorant is dispersed in water by using a surfactant, a polymerizable monomer, a surfactant and a polymerization initiator in an aqueous medium to emulsify and disperse and polymerize the polymerizable monomer in the aqueous medium under stirring and mixing, thereafter adding a salting-out agent to salt out polymer particles. Polymerized toner particles can be obtained by filtering, washing and drying the particles obtained by the salting-out. Thereafter, as required, external additives to impart functions may be added to the dried toner particles.

When the polymerized toner particle is produced, in addition to the polymerizable monomer, the surfactant, the polymerization initiator and the colorant, a fixation improving agent and a charge control agent may be further blended, whereby various properties of the polymerized toner particle thus obtained can be controlled and improved. In order to improve the dispersibility of the polymerizable monomer in the aqueous medium, and regulate the molecular weight of a polymer obtained, a chain transfer agent may be further used.

The polymerizable monomer used for production of the polymerized toner particle is not especially limited, but examples of the monomers include styrene and its derivatives, ethylenic unsaturated monoolefins such as ethylene and propylene, halogenated vinyls such as vinyl chloride, vinyl esters such as vinyl acetate, and α-methylene aliphatic monocarboxylates such as methyl acrylate, ethyl acrylate, methyl methacrylate, ethyl methacrylate, 2-ethylhexyl methacrylate, acrylic acid dimethylamino ester and methacrylic acid diethylamino ester.

The colorant (coloring material) usable in preparation of the polymerized toner particle is a conventionally known dye or pigment. For example, usable are carbon black, phthalocyanine blue, Permanent Red, chrome yellow and phthalocyanine green. These colorants may be modified on their surface using a silane coupling agent, a titanium coupling agent or the like.

The surfactant usable in production of the polymerized toner particle is an anionic surfactant, a cationic surfactant, an amphoteric surfactant and a nonionic surfactant.

Here, the anionic surfactant includes fatty acid salts such as sodium oleate and castor oil, alkylsulfate esters such as sodium laurylsulfate and ammonium laurylsulfate, alkylbenzenesulfonate salts such as sodium dodecylbenzenesulfonate, alkylnaphthalenesulfonate salts, alkylphosphate salts, naphthalenesulfonic acid-formalin condensates and polyoxyethylene alkylsulfate salts. The nonionic surfactant includes polyoxyethylene alkyl ethers, polyoxyethylene fatty acid esters, sorbitan fatty acid esters, polyoxyethylene alkylamines, glycerol, fatty acid esters and oxyethylene-oxypropylene block polymers. Furthermore, the cationic surfactant includes alkylamine salts such as laurylamine acetate, and quaternary ammonium salts such as lauryltrimethylammonium chloride and stearyltrimethylammonium chloride. Then, the amphoteric surfactant includes aminocarboxylate salts and alkylamino acids.

A surfactant as described above can be used usually in an amount in the range of 0.01 to 10% by weight with respect to a polymerizable monomer. Such a surfactant influences the dispersion stability of a monomer, and influences also the environmental dependency of a polymerized toner particle obtained. The use thereof in an amount in the range described above is preferable from the viewpoint of securing the dispersion stability of the monomer and reducing the environmental dependency of the polymerized toner particle.

For production of a polymerized toner particle, a polymerization initiator is usually used. The polymerization initiator includes a water-soluble polymerization initiator and an oil-soluble polymerization initiator. In the present invention, either of them can be used. Examples of the water-soluble polymerization initiators usable in the present invention include persulfate salts such as potassium persulfate and ammonium persulfate, and water-soluble peroxide compounds. Examples of the oil-soluble polymerization initiators include azo compounds such as azobisisobutyronitrile, and oil-soluble peroxide compounds.

Further in the case of using a chain transfer agent in the present invention, examples of the chain transfer agents include mercaptans such as octylmercaptan, dodecylmercaptan and tert-dodecylmercaptan, and carbon tetrabromide.

Further in the case where a polymerized toner particle used in the present invention comprises a fixability improving agent, the fixability improving agent usable is natural wax such as carnauba wax, and olefinic wax such as polypropylene and polyethylene.

Further in the case where the polymerized toner particle used in the present invention contains a charge control agent, the charge control agent to be used is not especially limited, and usable are nigrosine dyes, quaternary ammonium salts, organic metal complexes, metal-containing monoazo dyes and the like.

External additives to be used for improving the fluidity and the like of a polymerized toner particle include silica, titanium oxide, barium titanate, fluororesin microparticles, acrylic resin microparticles and the like. These may be used singly or in combination thereof.

The salting-out agent to be used for separation of a polymerized particle from an aqueous medium includes metal salts such as magnesium sulfate, aluminum sulfate, barium chloride, magnesium chloride, calcium chloride and sodium chloride.

The toner particle produced as described above has a volume-average particle size in the range of 2 to 15 μm, and preferably 3 to 10 μm, and the polymerized toner particle has a higher uniformity of particles than the pulverized toner particle. If the toner particle is smaller than 2 μm, the chargeability decreases and fogging and toner scattering are liable to be caused; and the toner particle exceeding 15 μm causes the deterioration of the image quality.

The ferrite carrier and the toner produced as described above are mixed to obtain an electrophotographic developer. The mixing ratio of the ferrite carrier and the toner, that is, the toner concentration is preferably set at 3 to 15% by weight. The toner concentration less than 3% by weight hardly provides a desired image density; and the toner concentration exceeding 15% by weight is liable to generate toner scattering and fogging.

The electrophotographic developer according to the present invention may be used as a refill developer. In this case, the mixing ratio of a ferrite carrier and a toner, that is, the toner concentration is preferably set at 100 to 3,000% by weight.

The electrophotographic developer according to the present invention, prepared as described above, can be used in copying machines, printers, FAX machines, printing machines and the like, which use a digital system using a development system in which electrostatic latent images formed on a latent image holder having an organic photoconductive layer are reversely developed with a magnetic brush of a two-component developer having a toner and a carrier while a bias electric field is being impressed. The electrophotographic developer is also applicable to full-color machines and the like using an alternative electric field, in which when a development bias is impressed from a magnetic brush to an electrostatic latent image side, an AC bias is superimposed on a DC bias.

Hereinafter, the present invention will be described specifically by way of Examples and the like.

EXAMPLES

Example 1

Preparation of a Ferrite Carrier Core Material (Ferrite Particle)

86 mol of $Fe_2O_3$, 12 mol of MgO, 0.5 mol of $TiO_2$ and 0.5 mol of $SrCO_3$ were weighed; and a mixture in which 1.03% by weight of a carbon black as a reducing agent with respect to the raw material weight was added to the raw material was mixed, crushed, and thereafter pelletized by a roller compactor. The obtained pellet was calcined in a rotary sintering furnace at 1,000° C. in a nitrogen atmosphere having an oxygen concentration of 0% by volume. The resultant was pulverized by a rod mill to thereby make a calcined powder for a ferrite carrier core material.

The calcined powder for a ferrite carrier core material was pulverized for 1 hour by a wet bead mill; a PVA as a binder component was added so as to be 1% by weight with respect to a slurry solid fraction; and a polycarboxylic acid-based dispersant was added so that the viscosity of the slurry became 2 to 3 poises. $D_{50}$ of the slurry particle size at this time was 3.259 μm.

The pulverized slurry thus obtained was granulated and dried by a spray drier, and subjected to a debindering treatment at 850° C. in a nitrogen atmosphere having an oxygen concentration of 0% by volume by using a rotary kiln to thereby obtain a particle for a ferrite core material.

4% by weight of the $TiO_2$ particle for coating was added to the particle for a ferrite core material, and mixed and stirred for 10 min by a mixing mill. An obtained mixture was loaded on a vibrating screen of 80 mesh to unbind aggregated materials to thereby make a raw material for a ferrite particle.

The raw material for a ferrite particle obtained in the above was regularly sintered by holding the raw material at 1,035° C. for 4 hours in a nitrogen atmosphere having an oxygen concentration of 0% by volume. Thereafter, the resultant was disintegrated, and further classified to thereby obtain a ferrite particle (ferrite carrier core material).

Example 2

A ferrite particle (ferrite carrier core material) was obtained by the same method as in Example 1, except for altering the regular sintering temperature to 1,085° C.

Example 3

A ferrite particle (ferrite carrier core material) was obtained by the same method as in Example 1, except for altering the regular sintering temperature to 1,000° C.

Example 4

A ferrite particle (ferrite carrier core material) was obtained by the same method as in Example 1, except for adding 3.5% by weight of the $TiO_2$ particle for ferrite coating with respect to the particle for a ferrite core material.

Example 5

A ferrite particle (ferrite carrier core material) was obtained by the same method as in Example 1, except for adding 6% by weight of the $TiO_2$ particle for coating with respect to the particle for a ferrite core material.

Example 6

A ferrite particle (ferrite carrier core material) was obtained by the same method as in Example 1, except for weighing 94 mol of $Fe_2O_3$, 5 mol of MgO, 0.5 mol of $TiO_2$ and 0.5 mol of $SrCO_3$ and adding 1.16% by weight of the carbon black as a reducing agent with respect to the raw material weight.

Example 7

A ferrite particle (ferrite carrier core material) was obtained by the same method as in Example 1, except for weighing 79 mol of $Fe_2O_3$, 20 mol of MgO, 0.5 mol of $TiO_2$ and 0.5 mol of $SrCO_3$ and adding 0.87% by weight of the carbon black as a reducing agent with respect to the raw material weight.

Example 8

A ferrite particle (ferrite carrier core material) was obtained by the same method as in Example 1, except for weighing 86 mol of $Fe_2O_3$, 12 mol of MgO and 0.5 mol of $SrCO_3$ and adding 1.04% by weight of the carbon black as a reducing agent with respect to the raw material weight.

Example 9

A ferrite particle (ferrite carrier core material) was obtained by the same method as in Example 1, except for weighing 86 mol of $Fe_2O_3$, 12 mol of MgO, 2 mol of $TiO_2$ and 0.5 mol of $SrCO_3$ and adding 1% by weight of the carbon black as a reducing agent with respect to the raw material weight.

Example 10

A ferrite particle (ferrite carrier core material) was obtained by the same method as in Example 1, except for weighing 86 mol of $Fe_2O_3$, 12 mol of MgO and 0.5 mol of $TiO_2$ and adding 1.03% by weight of the carbon black as a reducing agent with respect to the raw material weight.

Example 11

A ferrite particle (ferrite carrier core material) was obtained by the same method as in Example 1, except for weighing 86 mol of $Fe_2O_3$, 12 mol of MgO, 0.5 mol of $TiO_2$ and 1.25 mol of $SrCO_3$ and adding 1.02% by weight of the carbon black as a reducing agent with respect to the raw material weight.

Example 12

A ferrite particle (ferrite carrier core material) was obtained as in Example 1, except for changing the classification condition to thereby alter the average particle size to 20.94 μm.

Example 13

A ferrite particle (ferrite carrier core material) was obtained as in Example 1, except for changing the classification condition to thereby alter the average particle size to 48.34 μm.

Comparative Example 1

A ferrite particle (ferrite carrier core material) was obtained by the same method as in Example 1, except for altering the regular sintering temperature to 950° C.

Comparative Example 2

A ferrite particle (ferrite carrier core material) was obtained by the same method as in Example 1, except for altering the regular sintering temperature to 1,150° C.

Comparative Example 3

A ferrite particle (ferrite carrier core material) was obtained by the same method as in Example 1, except for adding no $TiO_2$ particle for coating to the particle for a ferrite core material.

Figure 6:
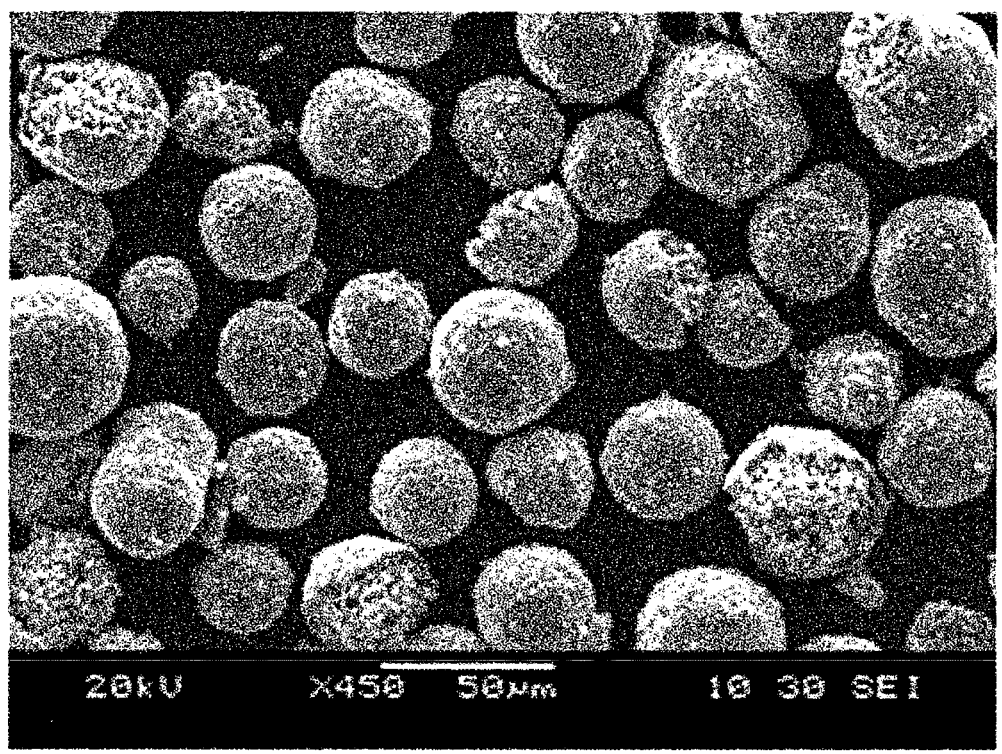
FIG. 6 is an electron microscopy photograph (×450) of a state where the ferrite particle according to the present invention is intentionally partially broken and portions having an outer shell structure and porous portions are present as a mixture.

There are shown in Table 1 blend proportions (molar ratios of amounts of raw materials fed), amounts of carbon, calcining conditions (calcining temperatures and calcining atmospheres), regular granulating conditions (slurry particle sizes and amounts of PVA added), debindering treatment conditions (treatment temperatures and treatment atmospheres), $TiO_2$ mixing conditions (amounts of addition and mixing conditions) and regular sintering conditions (regular sintering temperatures and regular sintering atmospheres) of the ferrite carrier core materials (ferrite particles) used in Examples 1 to 13 and Comparative Examples 1 to 3; and there are shown in Table 2 compositions, magnetic properties (magnetizations, residual magnetizations and coercive forces) and shapes (cross-sectional shapes, proportions accounted for by a portion having an outer shell structure in the peripheral length, and thicknesses of the portion having the outer shell structure) of the obtained ferrite carrier core materials (ferrite particles). There are further shown in Table 3 powder properties (BET specific surface areas, average particle sizes, apparent densities, true specific gravities, pore volumes and peak pore sizes) and 6.5 mm-gap bridge resistivitys (50 V, 100 V, 250 V, 500 V and 1,000 V) of the ferrite carrier core materials (ferrite particles) of Examples 1 to 13 and Comparative Examples 1 to 3. The measuring methods are each as described above. An electron microscopy photograph (×450) of a state that the ferrite particle of Example 1 was intentionally partially broken and portions having an outer shell structure and porous portions are present as a mixture is shown in FIG. 6.

TABLE 1

| | Ratios of Amounts of Raw Material Fed (mol) | | | | Amount of Carbon *1 | Calcining Condition | | Regular Granulating Condition | |
|---|---|---|---|---|---|---|---|---|---|
| | | | | | | Calcining Temperature | Calcining Atmosphere | Slurry Particle Size ($D_{50}$) | Amount of PVA added (10 wt % aqueous solution) |
| | $Fe_2O_3$ | MgO | $TiO_2$ | $SrCO_2$ | (wt %) | (° C.) | (vol %) | (μm) | |
| Example 1 | 86 | 12 | 0.5 | 0.5 | 1.03 | 1000 | 0 | 3.259 | 1 |
| Example 2 | 86 | 12 | 0.5 | 0.5 | 1.03 | 1000 | 0 | 3.245 | 1 |
| Example 3 | 86 | 12 | 0.5 | 0.5 | 1.03 | 1000 | 0 | 3.268 | 1 |
| Example 4 | 86 | 12 | 0.5 | 0.5 | 1.03 | 1000 | 0 | 3.229 | 1 |
| Example 5 | 86 | 12 | 0.5 | 0.5 | 1.03 | 1000 | 0 | 3.242 | 1 |
| Example 6 | 94 | 5 | 0.5 | 0.5 | 1.16 | 1000 | 0 | 3.231 | 1 |
| Example 7 | 79 | 20 | 0.5 | 0.5 | 0.87 | 1000 | 0 | 3.269 | 1 |
| Example 8 | 86 | 12 | 0 | 0.5 | 1.04 | 1000 | 0 | 3.24 | 1 |
| Example 9 | 86 | 12 | 2 | 0.5 | 1 | 1000 | 0 | 3.274 | 1 |
| Example 10 | 86 | 12 | 0.5 | 0 | 1.03 | 1000 | 0 | 3.227 | 1 |
| Example 11 | 86 | 12 | 0.5 | 1.25 | 1.02 | 1000 | 0 | 3.227 | 1 |
| Example 12 | 86 | 12 | 0.5 | 0.5 | 1.03 | 1000 | 0 | 3.254 | 1 |
| Example 13 | 86 | 12 | 0.5 | 0.5 | 1.03 | 1000 | 0 | 3.243 | 1 |
| Comparative Example 1 | 86 | 12 | 0.5 | 0.5 | 1.03 | 1000 | 0 | 3.247 | 1 |
| Comparative Example 2 | 86 | 12 | 0.5 | 0.5 | 1.03 | 1000 | 0 | 3.236 | 1 |
| Comparative Example 3 | 86 | 12 | 0.5 | 0.5 | 1.03 | 1000 | 0 | 3.228 | 1 |

| | Debindering Condition | | $TiO_2$ Mixing Condition | | Regular Sintering Condition | |
|---|---|---|---|---|---|---|
| | Treatment Temperature (° C.) | Treatment Atmosphere (vol %) | Amount of Addition (wt %) *2 | Mixing Time (min) | Regular Sintering Temperature (° C.) | Regular Sintering Atmosphere (vol %) |
| Example 1 | 850 | 0 | 4 | 10 | 1035 | 0 |
| Example 2 | 850 | 0 | 4 | 10 | 1085 | 0 |
| Example 3 | 850 | 0 | 4 | 10 | 1000 | 0 |
| Example 4 | 850 | 0 | 3.5 | 10 | 1035 | 0 |
| Example 5 | 850 | 0 | 6 | 10 | 1035 | 0 |
| Example 6 | 850 | 0 | 4 | 10 | 1035 | 0 |
| Example 7 | 850 | 0 | 4 | 10 | 1035 | 0 |
| Example 8 | 850 | 0 | 4 | 10 | 1035 | 0 |
| Example 9 | 850 | 0 | 4 | 10 | 1035 | 0 |
| Example 10 | 850 | 0 | 4 | 10 | 1035 | 0 |
| Example 11 | 850 | 0 | 4 | 10 | 1035 | 0 |
| Example 12 | 850 | 0 | 4 | 10 | 1035 | 0 |
| Example 13 | 850 | 0 | 4 | 10 | 1035 | 0 |
| Comparative Example 1 | 850 | 0 | 4 | 10 | 950 | 0 |
| Comparative Example 2 | 850 | 0 | 4 | 10 | 1150 | 0 |
| Comparative Example 3 | 850 | 0 | 0 | 10 | 1035 | 0 |

*1: the proportion to the weight of the mixed raw material
*2: the weight to the particle for a ferrite core material

TABLE 2

| | Composition of Core Material (ICP) (% by weight) | | | | Magnetic Properties at 5K · 1000/4π · A/m (VSM) | | | Shape of Ferrite Particle | | |
|---|---|---|---|---|---|---|---|---|---|---|
| | | | | | Magnetization | Residual Magnetization | Coercive Force | Cross-sectional Shape (SEM) | Proportion accounted for by the Portion having an Outer Shell Structure in the Peripheral Length (%) | Thickness of the Portion having an Outer Shell Structure (μm) |
| | Fe | Mg | Ti | Sr | (Am²/kg) | (Am²/kg) | (A/m) | | | |
| Example 1 | 66.5 | 1.98 | 2.45 | 0.3 | 75.67 | 7.74 | 44.68 | core-shell shape | 96 | 2.12 |
| Example 2 | 66.5 | 1.98 | 2.45 | 0.3 | 75.67 | 7.68 | 44.68 | core-shell shape | 98 | 4.86 |
| Example 3 | 66.5 | 1.98 | 2.45 | 0.3 | 75.67 | 7.72 | 44.68 | core-shell shape | 95 | 1.15 |
| Example 4 | 66.8 | 1.99 | 2.18 | 0.3 | 76.48 | 7.95 | 42.29 | core-shell shape | 90 | 1.87 |
| Example 5 | 65.2 | 1.95 | 3.53 | 0.3 | 72.51 | 8.37 | 53.69 | core-shell shape | 98 | 2.41 |
| Example 6 | 68.1 | 0.77 | 2.44 | 0.28 | 81.54 | 9.11 | 48.14 | core-shell shape | 95 | 2.17 |
| Example 7 | 64.4 | 3.49 | 2.47 | 0.32 | 68.36 | 7.8 | 40.36 | core-shell shape | 94 | 2.09 |
| Example 8 | 66.9 | 2 | 2.29 | 0 | 76.57 | 8.53 | 45.21 | core-shell shape | 82 | 2.2 |
| Example 9 | 65.2 | 1.95 | 2.93 | 1.17 | 73.03 | 7.34 | 43.12 | core-shell shape | 99 | 2.14 |
| Example 10 | 66.5 | 1.98 | 2.45 | 0.3 | 75.67 | 7.95 | 44.68 | core-shell shape | 93 | 2.25 |
| Example 11 | 66.5 | 1.98 | 2.45 | 0.3 | 75.67 | 8.09 | 44.68 | core-shell shape | 90 | 2.03 |
| Example 12 | 66.5 | 1.98 | 2.45 | 0.3 | 75.67 | 8.46 | 44.68 | core-shell shape | 93 | 2.21 |
| Example 13 | 66.5 | 1.98 | 2.45 | 0.3 | 75.67 | 8.2 | 44.68 | core-shell shape | 94 | 2.13 |
| Comparative Example 1 | 66.5 | 1.98 | 2.45 | 0.3 | 75.67 | 8.37 | 44.68 | porous shape | 75 | unmeasurable |
| Comparative Example 2 | 66.5 | 1.98 | 2.45 | 0.3 | 75.67 | 7.72 | 44.68 | grainy | 99 | unmeasurable |
| Comparative Example 3 | 69.2 | 2.06 | 0.17 | 0.31 | 82.36 | 6.1 | 23.92 | porous shape | 68 | unmeasurable |

TABLE 3

| | Powder Properties | | | | | | Resistivity (6.5 mm-gap) (V) | | | | |
|---|---|---|---|---|---|---|---|---|---|---|---|
| | BET Specific Surface Area | Average Particle Size | Apparent Density | True Specific Gravity | Pore Volume | Peak Pore Size | | | | | |
| | (m²/g) | (μm) | (g/cm³) | (g/cm³) | (ml/g) | (μm) | 50 | 100 | 250 | 500 | 1000 |
| Example 1 | 0.5254 | 32.55 | 1.38 | 4.95 | 0.013 | 1.039 | $1.8 \times 10^8$ | $1.1 \times 10^8$ | $1.4 \times 10^7$ | unmeasurable | unmeasurable |
| Example 2 | 0.5967 | 32.63 | 1.30 | 4.97 | 0.017 | 1.235 | $7.5 \times 10^9$ | $4.0 \times 10^9$ | $8.5 \times 10^7$ | unmeasurable | unmeasurable |
| Example 3 | 0.3656 | 33.32 | 1.46 | 4.85 | 0.010 | 0.818 | $9.5 \times 10^7$ | $6.0 \times 10^7$ | $2.8 \times 10^6$ | unmeasurable | unmeasurable |
| Example 4 | 0.4822 | 33.33 | 1.52 | 7.00 | 0.013 | 1.006 | $9.0 \times 10^9$ | $7.0 \times 10^8$ | $5.0 \times 10^7$ | unmeasurable | unmeasurable |
| Example 5 | 0.6925 | 33.10 | 1.21 | 5.01 | 0.018 | 1.382 | $2.8 \times 10^{10}$ | $6.3 \times 10^9$ | $5.2 \times 10^7$ | unmeasurable | unmeasurable |
| Example 6 | 0.5031 | 33.36 | 1.48 | 4.88 | 0.014 | 1.073 | $5.8 \times 10^7$ | $3.8 \times 10^7$ | $2.7 \times 10^6$ | unmeasurable | unmeasurable |
| Example 7 | 0.5487 | 32.83 | 1.18 | 5.02 | 0.015 | 1.095 | $1.5 \times 10^{10}$ | $8.5 \times 10^9$ | $7.5 \times 10^7$ | unmeasurable | unmeasurable |
| Example 8 | 0.7451 | 33.49 | 1.16 | 4.95 | 0.020 | 1.498 | $9.8 \times 10^7$ | $7.4 \times 10^7$ | $3.0 \times 10^7$ | unmeasurable | unmeasurable |
| Example 9 | 0.5139 | 33.35 | 1.42 | 4.91 | 0.014 | 1.040 | $7.3 \times 10^8$ | $4.5 \times 10^8$ | $9.5 \times 10^6$ | unmeasurable | unmeasurable |
| Example 10 | 0.4985 | 33.30 | 1.39 | 4.91 | 0.014 | 1.048 | $1.4 \times 10^8$ | $4.5 \times 10^7$ | $2.5 \times 10^6$ | unmeasurable | unmeasurable |
| Example 11 | 0.5379 | 32.89 | 1.34 | 4.90 | 0.015 | 1.121 | $7.5 \times 10^8$ | $3.5 \times 10^8$ | $3.5 \times 10^7$ | unmeasurable | unmeasurable |
| Example 12 | 0.7121 | 20.94 | 1.19 | 4.90 | 0.017 | 1.392 | $8.7 \times 10^7$ | $6.6 \times 10^7$ | $7.9 \times 10^6$ | unmeasurable | unmeasurable |
| Example 13 | 0.3549 | 48.34 | 1.49 | 4.89 | 0.010 | 0.781 | $6.5 \times 10^7$ | $3.3 \times 10^8$ | $5.9 \times 10^7$ | unmeasurable | unmeasurable |
| Comparative Example 1 | 1.0171 | 33.39 | 1.07 | 4.86 | 0.013 | 0.559 | $4.8 \times 10^7$ | $2.9 \times 10^7$ | unmeasurable | unmeasurable | unmeasurable |
| Comparative Example 2 | 0.1514 | 32.92 | 1.81 | 5.01 | 0.002 | 0.438 | $1.6 \times 10^7$ | $1.1 \times 10^7$ | $6.4 \times 10^6$ | $2.7 \times 10^6$ | unmeasurable |
| Comparative Example 3 | 0.3371 | 33.30 | 1.09 | 4.94 | 0.009 | 0.554 | $1.2 \times 10^8$ | $9.5 \times 10^7$ | $2.6 \times 10^7$ | unmeasurable | unmeasurable |

As shown in Table 2 and FIG. 6, the ferrite particles of Examples 1 to 13 all provided ferrite carrier core materials having an outer shell structure.

By contrast, the ferrite particle of Comparative Example 1, whose sintering temperature was low, though producing a porous structure, could not provide a ferrite particle having an outer shell structure.

The ferrite particle of Comparative Example 2, whose sintering temperature was high, did not make a ferrite particle having an outer shell structure.

The ferrite particle of Comparative Example 3, since no TiO₂ was added, made a ferrite particle having no outer shell structure.

Example 14

A resin solution was prepared in which an acrylic resin (BR-80, manufactured by Mitsubishi Rayon Co., Ltd.) powder was dissolved in toluene so that the resin solution contained 10% by weight of the resin solid fraction with respect to 100 parts by weight of the ferrite carrier core material (ferrite particle) obtained in Example 1. A resin impregnating solution was made in which 5 parts by weight of an aminosilane coupling agent (SZ-6011) as a charge control agent was added to the resin solution with respect to 100 parts by weight of the resin solid fraction. The obtained resin impregnating solution and the ferrite carrier core material were stirred and mixed by a universal mixing stirrer; and an obtained mixture was baked in a hot air drier set at 145° C. for 2 hours to thereby carry out a resin impregnating treatment on the ferrite carrier core material. Thereafter, aggregated particles were disintegrated to thereby obtain a resin-impregnated ferrite carrier.

Example 15

A resin-impregnated ferrite carrier was obtained as in Example 14, except for making a resin impregnating solution in which 5 parts by weight of a carbon black (EC600JD) as a conductive agent was added to the resin solution of Example 14 with respect to 100 parts by weight of the resin solid fraction, and dispersed.

Example 16

A resin-impregnated ferrite carrier was obtained as in Example 15, except for using a resin impregnating solution in which the amount of acrylic resin was altered to 5 parts by weight in terms of the resin solid fraction with respect to 100 parts by weight of the ferrite carrier core material.

Example 17

A resin-impregnated ferrite carrier was obtained as in Example 15, except for using a resin solution in which the amount of acrylic resin was altered to 15 parts by weight in terms of the resin solid fraction with respect to 100 parts by weight of the ferrite carrier core material.

Example 18

The resin-impregnated ferrite carrier (ferrite particle) obtained in Example 16 was employed as a resin-impregnated ferrite carrier core material; and a resin solution was prepared in which an acrylic resin (BR-80, manufactured by Mitsubishi Rayon Co., Ltd.) powder was dissolved in toluene so that the resin solution contained 1% by weight of the resin solid fraction with respect to 100 parts by weight of the resin-impregnated ferrite carrier core material. This resin coating solution and the ferrite carrier core material were fed in a fluidized bed coating apparatus, and resin coating was carried out; and an obtained mixture was baked in a hot air drier set at 145° C. for 2 hours to thereby carry out resin coating on the ferrite carrier core material. Thereafter, aggregated particles were disintegrated to thereby obtain a resin-coated ferrite carrier.

There are shown in Table 4 the ferrite carrier core materials (ferrite particles), coating apparatuses, resin conditions (kinds of resins and amounts of coating), additives (charge control agents and conductive agents) and curing conditions (temperatures and times) used for the ferrite carriers of Examples 14 to 18; and there are shown in Table 5 powder properties (apparent densities, true specific gravities, pore volumes and peak pore sizes), amounts of charge and 6.5 mm-gap bridge resistivitys (50 V, 100 V, 250 V, 500 V and 1,000 V). Here, a method for measuring the amounts of charge shown in Table 5 is as follows. The other measuring methods are as described above.

(The Amount of Charge of the Ferrite Carrier)

A sample (a ferrite carrier) and a commercially available negatively chargeable toner used in full-color printers and having an average particle size of about 5.5 were weighed so that the toner concentration was 6.5% by weight (the toner weight was 3.25 g, and the ferrite carrier weight was 46.75 g). The weighed ferrite carrier and toner were exposed for 12 hours or more to each environment described later. Thereafter, the ferrite carrier and the toner were put in a 50-cc glass bottle, and stirred at a rotation frequency of 100 rpm for 30 min.

As an apparatus for measuring the amount of charge, a magnet roll in which a magnet (magnetic flux density: 0.1 T) of a total of 8 poles of N poles and S poles alternately arranged was arranged on the inner side of an aluminum bare tube (hereinafter, sleeve) of a cylindrical shape of 31 mm in size and 76 mm in length, and a cylindrical electrode was arranged in the outer circumference of the sleeve with a gap of 5.0 mm from the sleeve.

0.5 g of a developer was uniformly adhered on the sleeve, and thereafter, while the magnet roll, which was on the inner side, was being rotated at 100 rpm with the outer-side aluminum bare tube being fixed, a direct current voltage of 2,000 V was impressed for 60 sec between the outer electrode and the sleeve to transfer the toner to the outer-side electrode. At this time, an electrometer (an insulation-resistivity tester, model: 6517A, manufactured by Keithley Instruments Inc.) was connected to the cylindrical electrode to measure the amount of charge of the transferred toner.

After the elapse of 60 sec, the impressed voltage was shut off, and after the rotation of the magnet roll was stopped, the outer-side electrode was taken out and the weight of the toner having transferred to the electrode was measured.

The amount of charge was calculated from the measured amount of charge and the measured weight of the transferred toner.

Here, the conditions of each environment are as follows.

A normal-temperature and normal-humidity (N/N) environment: a temperature of 20 to 25° C. and a relative humidity of 50 to 60%

A low-temperature and low-humidity (L/L) environment: a temperature of 10 to 15° C. and a relative humidity of 10 to 15%

A high-temperature and high-humidity (H/H) environment: a temperature of 30 to 35° C. and a relative humidity of 80 to 85%

TABLE 4

| | | | Resin | | Additive 1 | | Additive 2 | | Curing Condition | |
|---|---|---|---|---|---|---|---|---|---|---|
| | Core Material Particle | Coating Apparatus | Kind of Resin | Amount of Coating *4 (parts by weight) | Charge Control Agent | Amount of Addition *5 (parts by weight) | Conductive Agent | Amount of Addition *5 (parts by weight) | Curing Temperature (° C.) | Curing Time (hr) |
| Example 14 | core material particle obtained in Example 1 | universal mixing stirrer | acrylic resin *6 | 10 | aminosilane coupling agent *7 | 5 | carbon black *8 | 0 | 145 | 2 |

TABLE 4-continued

|  | Core Material Particle | Coating Apparatus | Resin | | Additive 1 | | Additive 2 | | Curing Condition | |
|---|---|---|---|---|---|---|---|---|---|---|
|  |  |  | Kind of Resin | Amount of Coating *4 (parts by weight) | Charge Control Agent | Amount of Addition *5 (parts by weight) | Conductive Agent | Amount of Addition *5 (parts by weight) | Curing Temperature (° C.) | Curing Time (hr) |
| Example 15 | core material particle obtained in Example 1 | universal mixing stirrer | acrylic resin *6 | 10 | aminosilane coupling agent *7 | 5 | carbon black *8 | 5 | 145 | 2 |
| Example 16 | core material particle obtained in Example 1 | universal mixing stirrer | acrylic resin *6 | 5 | aminosilane coupling agent *7 | 5 | carbon black *8 | 5 | 145 | 2 |
| Example 17 | core material particle obtained in Example 1 | universal mixing stirrer | acrylic resin *6 | 15 | aminosilane coupling agent *7 | 5 | carbon black *8 | 5 | 145 | 2 |
| Example 18 | core material particle obtained in Example 16 | fluidized bed coating apparatus | acrylic resin *6 | 1 | none | | none | | 145 | 2 |

*4: the amount to 100 parts by weight of the carrier core material
*5: the amount to 100 parts by weight of the resin solid fraction
*6: BR-80 (manufactured by Mitsubishi Rayon Co., Ltd.)
*7: SZ-6011
*8: EC600JD

TABLE 5

| | Powder Properties | | | | Amount of Charge (μC) | | | Resistivity (6.5 mm-gap) (V) | | | | |
|---|---|---|---|---|---|---|---|---|---|---|---|---|
| | Apparent Density | True Specific Gravity | Pore Volume | Peak Pore Size | | | | | | | | |
| | (g/cm$^3$) | (g/cm$^3$) | (ml/g) | (μm) | N/N | L/L | H/H | 50 | 100 | 250 | 500 | 1000 |
| Example 14 | 1.46 | 3.98 | 84.91 | 0.345 | 37.51 | 39.12 | 36.73 | $1.5 \times 10^{12}$ | $1.2 \times 10^{12}$ | $1.1 \times 10^{12}$ | $9.5 \times 10^{10}$ | $1.4 \times 10^{10}$ |
| Example 15 | 1.44 | 3.97 | 86.70 | 0.561 | 30.13 | 32.81 | 29.61 | $1.4 \times 10^{12}$ | $9.8 \times 10^{11}$ | $8.9 \times 10^{11}$ | $5.3 \times 10^{10}$ | $6.3 \times 10^{8}$ |
| Example 16 | 1.40 | 4.26 | 93.42 | 0.510 | 25.45 | 27.55 | 24.09 | $7.8 \times 10^{10}$ | $2.5 \times 10^{10}$ | $3.8 \times 10^{8}$ | $4.2 \times 10^{6}$ | unmeasurable |
| Example 17 | 1.51 | 3.87 | 56.48 | 0.675 | 40.33 | 43.16 | 39.61 | $2.3 \times 10^{12}$ | $2.1 \times 10^{12}$ | $1.8 \times 10^{12}$ | $1.1 \times 10^{12}$ | $9.8 \times 10^{11}$ |
| Example 18 | 1.39 | 3.83 | 25.12 | 1.201 | 33.45 | 36.88 | 30.08 | $5.4 \times 10^{12}$ | $3.7 \times 10^{12}$ | $2.4 \times 10^{12}$ | $9.5 \times 10^{12}$ | $4.2 \times 10^{11}$ |

As is clear from the results in Table 5, the ferrite carriers of Examples 14 to 18 were good in the charging property in each of the environments and good also in the resistivity.

INDUSTRIAL APPLICABILITY

The ferrite particle according to the present invention, since having an outer shell structure, has a low apparent density, and can fill a fixed volume in a small weight thereof while various properties thereof are maintained in controllable states. Therefore, an electrophotographic developer comprising a ferrite carrier, obtained by using the ferrite particle as a ferrite carrier core material and impregnating and/or coating the ferrite carrier core material with a resin, and a toner, since being low in the stirring stress to the toner, hardly causes spent and is excellent in the charging stability in long-period usage.

Therefore, the present invention can be used broadly particularly in the fields of full-color machines requiring a high image quality and high-speed machines requiring the reliability and the durability of the image maintenance.

The invention claimed is:

1. A ferrite carrier core material for an electrophotographic developer comprising a ferrite particle, wherein
the ferrite particle consists of a porous structure of ferrite in an interior, and an outer shell structure of ferrite having a higher density than the interior, on an outer periphery.

2. The ferrite carrier core material according to claim 1, wherein a portion having the outer shell structure of the ferrite particle has a thickness of 0.5 to 10 μm.

3. The ferrite carrier core material according to claim 1, wherein the ferrite particle has a volume-average particle size of 15 to 60 μm.

4. A resin-impregnated ferrite carrier core material for an electrophotographic developer, being obtained by impregnating the ferrite carrier core material according to claim 1 with a resin.

5. A ferrite carrier for an electrophotographic developer, being obtained by impregnating the ferrite carrier core material according to claim 1 with a resin.

6. An electrophotographic developer, comprising a ferrite carrier according to claim 5 and a toner.

7. The electrophotographic developer according to claim 6, being a refill developer.

8. A ferrite carrier for an electrophotographic developer, being obtained by impregnating and further coating the ferrite carrier core material according to claim 1 with a resin.

\* \* \* \* \*